United States Patent
Hirata et al.

(10) Patent No.: US 7,336,116 B2
(45) Date of Patent: Feb. 26, 2008

(54) CLOCK SUPPLY CIRCUIT

(75) Inventors: Akio Hirata, Kyoto (JP); Takahiro Ichinomiya, Katano (JP); Takashi Ando, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 113 days.

(21) Appl. No.: 11/342,568

(22) Filed: Jan. 31, 2006

(65) Prior Publication Data

US 2006/0170479 A1     Aug. 3, 2006

(30) Foreign Application Priority Data

Jan. 31, 2005  (JP) ............................ 2005-023044

(51) Int. Cl.
  *G06F 1/04* (2006.01)
  *H03K 3/00* (2006.01)
(52) U.S. Cl. .................. 327/293; 327/295; 327/298; 327/99
(58) Field of Classification Search ............... None
See application file for complete search history.

(56) References Cited

U.S. PATENT DOCUMENTS

| 5,764,710 | A | * | 6/1998 | Cheng et al. ............... 375/371 |
| 5,923,188 | A | * | 7/1999 | Kametani et al. ............. 326/93 |
| 6,020,774 | A | * | 2/2000 | Chiu et al. ................... 327/295 |
| 6,721,932 | B2 | | 4/2004 | Ohyama et al. |
| 6,724,231 | B2 | * | 4/2004 | Yoshikawa ................... 327/291 |
| 6,844,767 | B2 | * | 1/2005 | Shelor ......................... 327/291 |
| 7,042,267 | B1 | * | 5/2006 | Pasqualini .................... 327/291 |

FOREIGN PATENT DOCUMENTS

JP    10-308450    11/1998

\* cited by examiner

*Primary Examiner*—Tuan T Lam
(74) *Attorney, Agent, or Firm*—McDermott Will & Emery LLP

(57) ABSTRACT

The clock supply circuit of the present invention comprises a plurality of clock supply paths and a clock gate circuit. The clock supply paths branch a clock signal and supply each of the branched clock signals to a plurality of sequential circuits via a buffer. The clock gate circuit is inserted at least to one of the clock supply paths, which lets through the clock signals when a control signal is in a first logic state and, when the control signal is in a second logic state, outputs an inversion signal of a logic level that is outputted in a previous occasion where the control signal in the second logic state is applied.

10 Claims, 17 Drawing Sheets

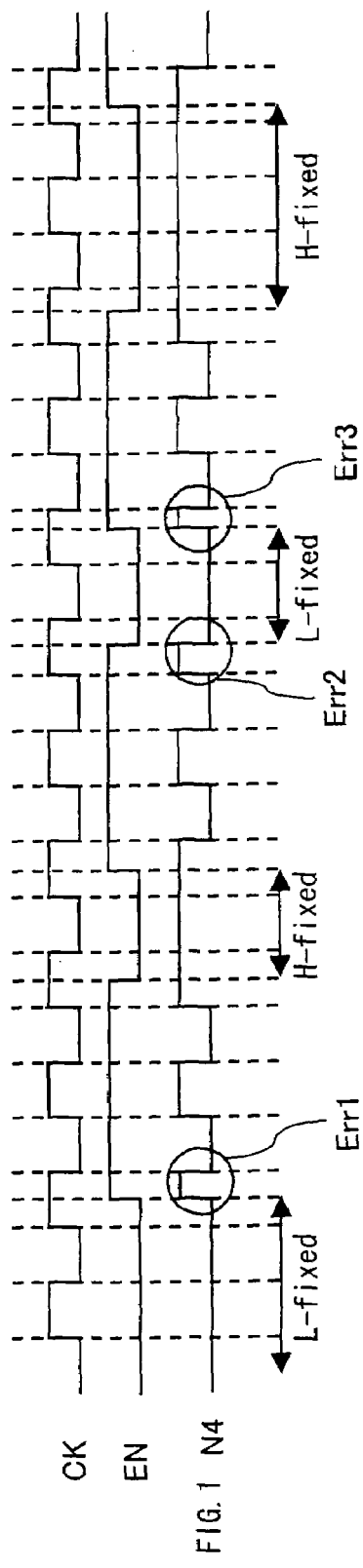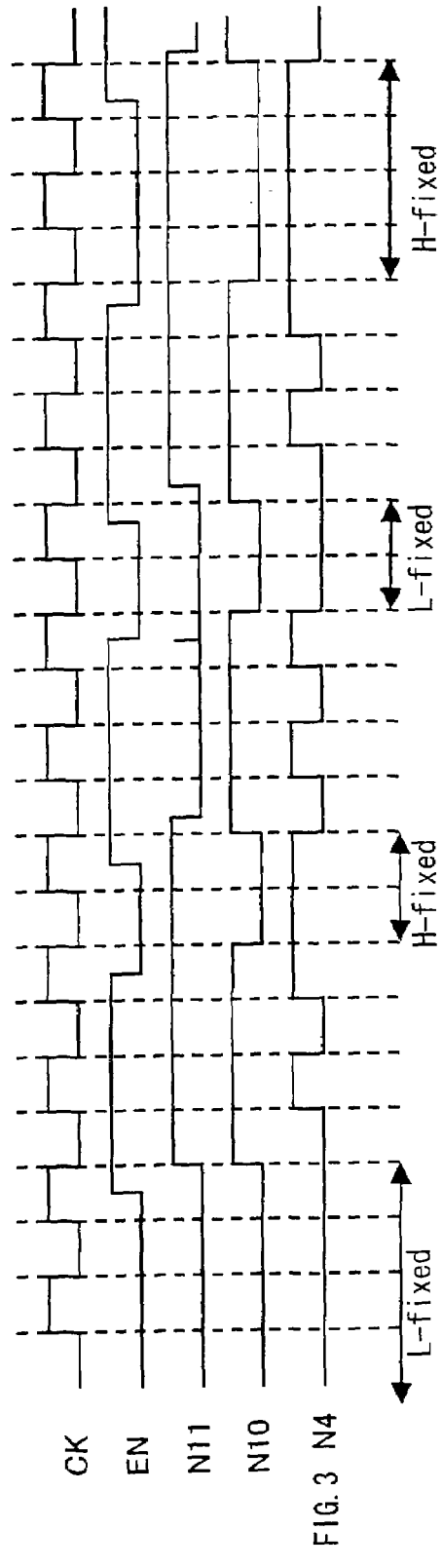

F I G. 8
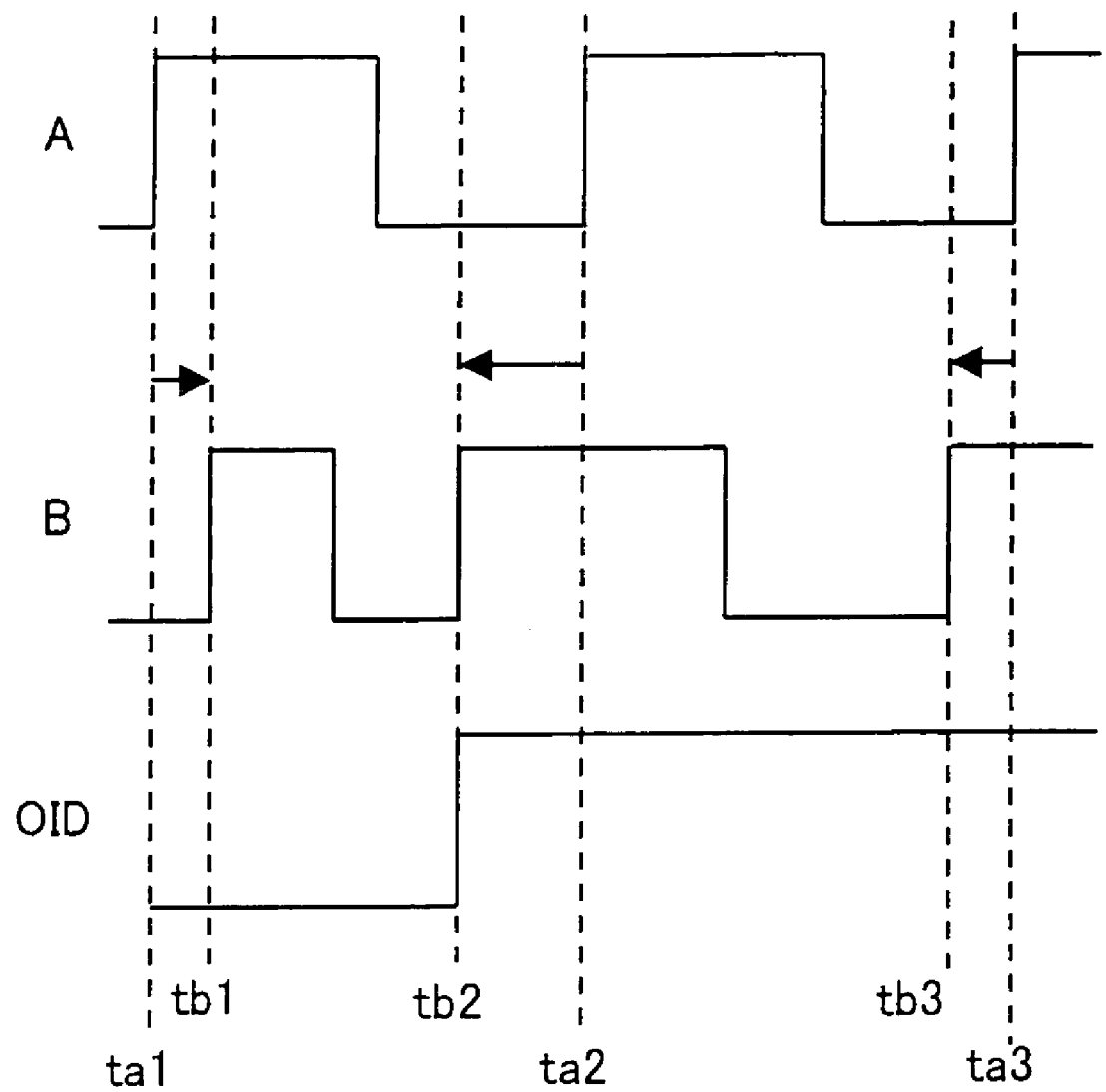

CLOCK SUPPLY CIRCUIT

BACKGROUND OF THE INVENTION

1. Field of the Invention

The present invention relates to a clock supply circuit that supplies clock signals to a built-in sequential circuit of a semiconductor integrated circuit and to a semiconductor system comprising the same. Particularly, the present invention relates to a gated clock technique for reducing power consumption of the circuit.

2. Description of the Related Art

Recently, a semiconductor integrated circuit faces a problem of power consumption that is increased in accordance with increased scale and speed thereof. Conventionally, there is known a technique called a gated clock for reducing the power consumption. In a circuit using this technique, if it is unnecessary to supply a clock signal to a certain sequential circuit (memory cell), the clock signal to be supplied to the sequential circuit is fixed to high level or low level. An example may be a case where it is clear that the stored content of a flip flop will not be updated even if the clock signal is supplied. With this, it enables reduction in the number of changes of the clock signals, thereby allowing a decrease in the circuit power consumption.

FIG. 15 is an illustration for showing the structure of a conventional clock supply circuit. A clock supply circuit 1 shown in FIG. 15 comprises buffers 11-16, and an AND gate 20 as a clock gate circuit. The clock supply circuit 1 comprises four clock paths starting from the buffer 11 and reaching flip flops F1-F4.

A clock signal CK propagated on the clock paths and an enabling signal EN for controlling propagation of the clock signal CK are inputted to the AND gate 20. When the enabling signal is "1", the AND gate 20 lets through the clock signal CK. Thus, the clock signal CK reaches the flip flops F3 and F4 via the buffers 15 and 16. In the meantime, when the enabling signal is "0", output of the AND gate is fixed to "0". Thus, the clock signal CK does not reach the flip flops F3 and F4. By fixing the enabling signal to "0" in this way, it is possible to reduce the number of changes in the clock signal CK and decrease the circuit power consumption.

In the clock supply circuit 1, a NOR gate may be used instead of the AND gate 20. The NOR gate lets through the clock signal CK when the enabling signal EN is "0", and intercepts the clock signal CK when the enabling signal EN is "1".

The clock supply circuit having a gated clock function has such a problem that there is a large difference in delay time (clock skew) until reach of the clock signals, which is generated between the flip flops connected at the terminal ends of each clock path. Therefore, a conventional clock circuit disclosed in Japanese Patent Literature (Japanese Patent No. 3178371) employs a method in which the clock paths are formed with the same length and same stages and a group of flip flops is allotted to each clock path equally for suppressing the clock skew. With this, clock skew caused by the difference between the clock paths can be suppressed.

In the recent semiconductor integrated circuit, it becomes necessary to cope with clock skew caused by deterioration of the transistor with time in addition to the above-described clock skew caused by the difference between the clock paths. However, the conventional clock supply circuit is not designed to deal with the clock skew caused by the deterioration of the transistor occurred with time.

In the followings, there is described a reason for generation of clock skew due to deterioration with time occurred in a PMOS transistor. It is known that a PMOS transistor included in a semiconductor integrated circuit deteriorates with time due to negative bias temperature instability (NBTI). NBTI is a phenomenon of an increase in the threshold voltage and a decrease in the current capacity of the PMOS transistor, which is caused when fixed electric charges are formed by dissociation of hydrogen present in the interface between a gate insulating film and a silicon substrate under the state where the PMOS transistor is ON at a high temperature (for example, the source voltage and drain voltage are 0V and the gate voltage is negative bias).

By referring to FIG. 16 and FIG. 17, influences of NBTI exerted on the clock supply circuit will be described. FIG. 16 is a block diagram of the clock paths including the clock gate circuit. Let us look into a case where a clock signal CK with a duty ratio of 50% is inputted to the circuit shown in FIG. 16 for a prescribed time T, and the enabling signal EN for gating the clock is set as "0". In this case, the states of nodes N1-N3 alternately repeat "0" and "1", and PMOS transistors QP1, QP2 both become ON (i.e. the input signal becomes "0") for a time T/2. As described, the PMOS transistors QP1 and QP2 both receive the influence of NBTI for the time T/2. Thus, the current capacities of the PMOS transistors QP1 and QP2 deteriorate for the same amount from the initial state.

Meanwhile, when the enabling signal EN is "0", the states of the nodes N4, N5 and N6 are fixed to "0", "1", and "0, respectively. At this time, the PMOS transistor QP4 is always OFF, thus receiving no influence from NBTI. However, the PMOS transistor QP3 is always ON so that it receives an influence from NBTI for the time T. Accordingly, the current capacity of the PMOS transistor QP4 does not deteriorate at all but that of the PMOS transistor QP3 deteriorates tremendously.

FIG. 17 is a signal waveform diagram of an input/output signal when the enabling signal is set to high level after the time T has passed and a clock is supplied to the nodes N1-N6 in the circuit of FIG. 16.

In FIG. 17, rise delay time (Tp1 and Tp3) of the node N2 and the node N5 depends on the current capacities of the PMOS transistors QP1 and QP3, respectively, and fall delay time (Tn1 and Tn3) of the node N2 and the node N5 depends on the current capacities of the NMOS transistors QN1 and QN3, respectively. Rise delay time (Tp2 and Tp4) of the node N3 and the node N6 depends on the current capacities of the PMOS transistors QP2 and QP4, respectively, and fall delay time (Tn2 and Tn4) of the node N3 and the node N6 depends on the current capacities of the NMOS transistors QN2 and QN4, respectively.

As described above, the current capacities of the PMOS transistors QP1 and QP2 deteriorate for the same amount from the initial state, the current capacity of the PMOS transistor QP4 does not deteriorate at all, and the current capacity of the PMOS transistor QP3 deteriorates tremendously. Therefore, when each rise delay time (Tp1, Tp2, Tp3, and Tp4) in the initial state is the same, the relation between the four kinds of rise delay time after the time T can be expressed by a following expression (1).

$$Tp4 < Tp1 = Tp2 < Tp3 \tag{1}$$

Further, as shown in FIG. 17, rise delay time Tr1 from N1 to N3 is (Tn1+Tp2), fall delay time Tf1 is (Tp1+Tn2), rise delay time Tr2 from N4 to N6 is (Tn3+Tp4), and fall delay time Tf2 is (Tp3+Tn4). Thus, at the initial state and the state after the time T has passed, a following expression (2) can be found from the above-described expression (1) provided that the four kinds of rise delay time (Tn1, Tn2, Tn3, and Tn4) are the same.

$$Tr2 < Tr1 = Tf1 < Tf2 \qquad (2)$$

In the case where there are two same partial circuits (for example, the circuit shown in FIG. 15) included in the clock supply circuit, it can be seen from the expression (2) that delay time of the two partial circuits is consistent with each other at the initial state but differs as the time passes when the clock signal is constantly supplied to one of the partial circuit and a clock fixed signal is mainly supplied to the other partial circuit.

For example, in the clock supply circuit 1 shown in FIG. 15, when the clock signal CK is supplied for a certain length of time while the enabling signal EN is set as "0", there generates clock skew between the flip flops F1 and F3 even though there is no clock skew in the initial state between the flip flops F1 and F3.

As described, in the clock supply circuit having a gated clock function, there increases the clock skew as the time passes between the flip flop to which the clock signal is supplied constantly and the flip flop to which the clock fixed signal is mainly supplied. The clock skew gradually increases while the semiconductor integrated circuit is in normal operation.

SUMMARY OF THE INVENTION

The main object of the present invention therefore is to provide a clock supply circuit which can suppress the above-described clock skew that is caused by deterioration of a transistor occurred with time.

The point of the present invention for overcoming the aforementioned problem is to switch the high-level fixed state and the low-level fixed state as appropriate but not to constantly keep the logic level of the fixed clock when being gated.

Based on such view point, the clock supply circuit according to the present invention comprises: a plurality of clock supply paths for branching a clock signal and supplying each of the branched clock signals to a plurality of sequential circuits via a buffer; and a clock gate circuit inserted at least to one of the clock supply paths, which lets through the clock signals when a control signal is in a first logic state and, when the control signal is in a second logic state, outputs an inversion signal of a logic level that is outputted in a previous occasion where the control signal in the second logic state is applied.

In this structure, every time the control signal is switched to the second logic state for fixing the clock signal to be supplied to the sequential circuit via the buffer, the state of the output signal outputted from the clock gate circuit to the sequential circuit via the buffer is alternately switched between high-level fixed state and low-level fixed state. This allows long-term suppression of clock skew that is caused due to deterioration of transistors constituting the buffer occurred with time.

In the above-described structure, it is preferable for the clock gate circuit to be formed with a toggle flip flop that inverts output every time logic of the control signal is inverted and a selector that selectively outputs either the clock signal or output of the toggle flip flop in accordance with the logic of the control signal.

In this structure, when the control signal is in the first logic state, the selector selects the clock signal so that the clock signal is supplied to the sequential circuit via the buffer. Further, when the control signal is in the second logic state, the selector selects the output of the toggle flip flop. At that time, every time the control signal comes in the second logic state, output of the toggle flip flop is logically inverted. Every time the selector selects the output of the toggle flip flop, output of the toggle flip flop is logically inverted. Thus, the output signal outputted from the selector to the sequential circuit via the buffer is switched form high-level fixed state to low-level fixed state alternately. This allows suppression of clock skew caused due to deterioration with time. The clock gate circuit requires only a toggle flip flop and a selector so that it is possible to achieve suppression of clock skew while restricting an increase of the area.

In the above-described structure, there are some preferable forms for the structures of the selector and the toggle flip flop as will be described below.

In one form, the selector selectively outputs the clock signal when the control signal is high level, and selectively outputs the output of the toggle flip flop when the control signal is low level. The toggle flip flop inversely outputs a stored signal of the toggle flip flop when the control signal rises.

In another form, the selector selectively outputs the clock signal when the control signal is low level, and selectively outputs the output of the toggle flip flop when the control signal is high level. The toggle flip flop inversely outputs the stored signal of the toggle flip flop when the control signal falls.

Furthermore, in the above-described structure, it is preferable for the clock gate circuit to comprise a latch circuit, a toggle flip flop and a selector.

When the clock signal applied to an enabling terminal is in a first logic state, the latch circuit outputs the control signal to be applied to a data input terminal and, when the clock signal applied to the enabling terminal is in a second logic state, keeps and outputs the control signal that is applied to the data input terminal right before the first logic state changes to the second logic state. The toggle flip flop inverts output every time the output signal logic of the latch circuit is inverted. The selector selectively outputs either the clock signal or output of the toggle flip flop in accordance with the output signal logic of the latch circuit.

With this structure, it is possible to prevent an influence of glitch, extra consumption of electric power in the buffer included on the clock path, and malfunction of the sequential circuit.

Further, the clock supply circuit of the above-described structure is preferable to be formed as follows. That is, when the clock signal applied to the enabling terminal is low level, the latch circuit outputs the control signal to be applied to the data input terminal and, when the clock signal is high level, keeps and outputs the control signal that is applied to the data input terminal right before the first logic state changes to the second logic state. The selector selectively outputs the clock signal when the output signal of the latch circuit is high level, and selectively outputs the output of the toggle flip flop when the output signal is low level. The toggle flip flop inversely outputs the stored signal of the toggle flip flop when the output signal of the latch circuit rises.

Furthermore, in the above-described clock supply circuit comprising the toggle flip flop, it is preferable to have a delay element for delaying to output a signal, which is inserted between an output terminal of the toggle flip flop and a data input terminal of the selector. With this, prevention of glitch generated in the selector can be secured, which allows prevention of extra consumption of electric power in the buffer included in the clock paths thereafter and malfunction of the sequential circuit.

It is preferable for the delay time of the delay element to be set longer than a difference between delay time by which the signal propagates from a selector terminal of the selector to an output terminal thereof and delay time by which the signal propagates from a toggle terminal of the toggle flip flop to the output terminal thereof. This allows suppression of glitches.

Further, another clock supply circuit according to the present invention comprises: a plurality of clock supply paths for branching a clock signal and supplying each of the branched clock signals to a plurality of sequential circuits via a buffer; a random number generator which randomly generates high level and low level in accordance with a change of a control signal; and a clock gate circuit inserted at least to one of the clock supply paths, which lets through the clock signals when a control signal is in a first logic state and, when the control signal is in a second logic state, outputs a random number of the high level or the low level outputted from the random number generator.

In this structure, the state of the buffer to which supply of the clock signal should be intercepted is switched between the high-level fixed state and the low-level fixed state alternately. Therefore, it is possible to suppress clock skew caused due to deterioration of the buffer-structure transistor occurred with time.

Moreover, still another clock supply circuit according to the present invention comprises: a plurality of clock supply paths for branching a clock signal and supplying each of the branched clock signals to a plurality of sequential circuits via a buffer; a skew detection circuit for detecting a difference between respective arrival time of the clock signals applied to two or more of the sequential circuits; and a clock gate circuit inserted at least to one of the clock supply paths, which lets through the clock signals when a control signal is in a first logic state and, when the control signal is in a second logic state, outputs a logic state depending on the output of the skew detection circuit. The skew detection circuit detects a difference between arrival time of the clock signal at the sequential circuit to which the clock signal is constantly applied and arrival time of the clock signal at the sequential circuit to which the clock signal is gated.

In this structure, the signal level of the buffer to which supply of the clock signal should be intercepted is fixed to the level in the direction by which the clock skew due to the deterioration with time becomes smaller. This allows suppression of clock skew caused due to deterioration of the buffer-structure transistor occurred with time.

In the above-described structure, it is preferable to supply the clock signals of the same timing to the skew detection circuit and the clock gate circuit.

Further, yet another clock supply circuit according to the present invention comprises: a plurality of clock supply paths for branching a clock signal and supplying each of the branched clock signals to a plurality of sequential circuits via a buffer; a clock signal counter which, when a control signal is in a second logic state, counts number of pulses of the clock signal and inverses output every time a counted value thereof reaches a specific value; and a clock gate circuit inserted at least to one of the clock supply paths, which lets through the clock signals when a control signal is in a first logic state and, when the control signal is in a second logic state, outputs an output signal of the clock signal counter.

In this structure, the state of the buffer to which supply of the clock signal should be intercepted is alternately switched between the high-level fixed state and the low-level fixed state. The high-level fixed period and the low-level fixed period become the same. Therefore, it is possible to achieve highly secured and long-term suppression of clock skew that is caused due to deterioration of the buffer-structure transistor occurred with time.

Furthermore, another clock supply circuit according to the present invention comprises: a plurality of clock supply paths for branching a clock signal and supplying each of the branched clock signals to a plurality of sequential circuits via a buffer; a control signal counter which, when a control signal is in a second logic state, counts number of pulses of the control signal and inverses output every time a counted value thereof reaches a specific value; and a clock gate circuit inserted at least to one of the clock supply paths, which lets through the clock signals when a control signal is in a first logic state and, when the control signal is in a second logic state, outputs an output signal of the control signal counter.

In this structure, the state of the buffer to which supply of the clock signal should be intercepted is alternately switched between the high-level fixed state and the low-level fixed state every time the control signal changes. This allows suppression of clock skew caused due to deterioration of the buffer-structure transistor occurred with time. Further, it is possible to suppress the clock skew caused by deterioration with time even if there is a periodicity in the period where the clock is fixed.

Further, still another clock supply circuit according to the present invention comprises: a plurality of clock supply paths for branching a clock signal and supplying each of the branched clock signals to a plurality of sequential circuits via a buffer; and a clock gate circuit inserted at least to one of the clock supply paths, which lets through the clock signals when a control signal is in a first logic state and, when the control signal is in a second logic state, outputs an inversion signal of a logic level that is outputted in a previous occasion where a power supplied signal is applied, every time the power supplied signal is applied.

In this structure, the high-level fixed state and the low-level fixed state are switched every time the power is supplied to the semiconductor integrated circuit. This allows suppression of clock skew caused due to deterioration of the buffer-structure transistor occurred with time even in the case where, for example, the clock is continuously stopped after a supply of power.

Moreover, yet another clock supply circuit according to the present invention comprises: a plurality of clock supply paths for branching a clock signal and supplying each of the branched clock signals to a plurality of sequential circuits via a buffer; a timer for measuring time when a control signal is in a second logic state; and a clock gate circuit inserted at least to one of the clock supply paths, which lets through the clock signals when a control signal is in a first logic state and, when the control signal is in a second logic state, outputs an inversion signal every time the time measured by the timer reaches a specific time.

In this structure, the state of the buffer to which supply of the clock signal should be intercepted is alternately switched between the high-level fixed state and the low-level fixed state after every specific time. This allows suppression of clock skew caused due to deterioration of the buffer-structure transistor occurred with time.

Further, a designing method of a semiconductor system according to the present invention selects one of clock supply circuits, when a plurality of any of the above-described clock gate circuits of different kinds are disposed in the clock supply paths, in accordance with applied frequency of control signal per unit time, whether or not the sequential circuit is allowed to operate during a period where the clock signal is mainly gated, whether or not there is a periodicity in the control signal, and whether or not there is temporary transition for the control signal.

In the present invention, the state of the output signal from the clock gate circuit to the sequential circuit via the buffer is switched between the high-level fixed state and the low-level fixed state. Therefore, it is possible to achieve a long-term suppression of clock skew caused due to deterioration of the buffer-structure transistor occurred with time.

The clock supply circuit of the present invention is capable of suppressing the clock skew that is caused due to deterioration of the transistor occurred with time. Thus, it can be utilized for various semiconductor integrated circuits which employ a gated clock system such as system-on-chip and the like.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

FIG. 4A is a timing chart for showing operation of the clock supply circuit according to the first embodiment of the present invention;

FIG. 4B is a timing chart for showing operation of the clock supply circuit according to the second embodiment of the present invention;

FIG. 8 is a timing chart for showing operation of the skew detection circuit according to the fourth embodiment of the present invention;

DETAILED DESCRIPTION OF THE PREFERRED EMBODIMENTS

Preferred embodiments of the present invention will be described hereinafter by referring to the accompanying drawings.

First Embodiment

Figure 1:
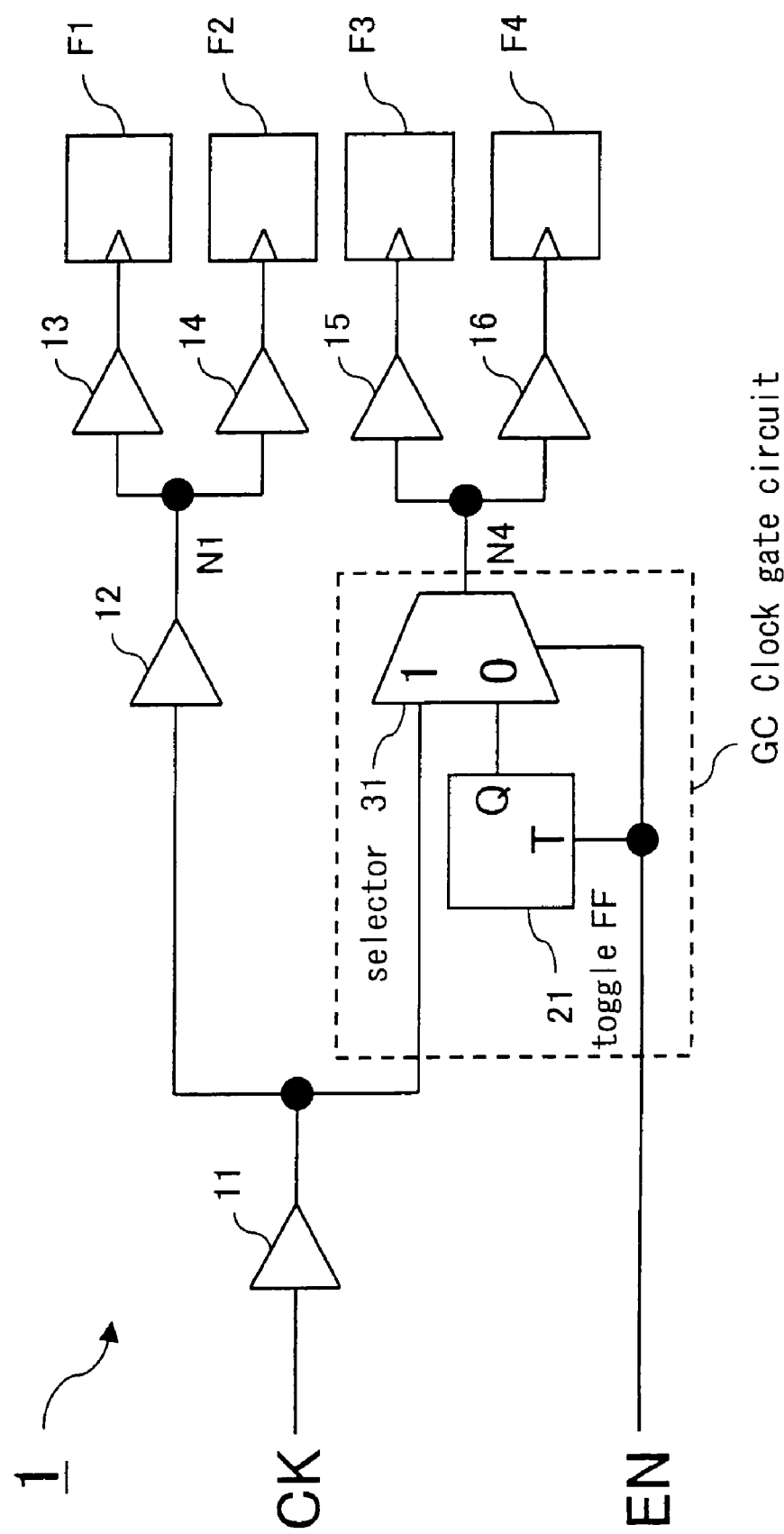
FIG. 1 is a block diagram for showing the structure of a clock supply circuit according to a first embodiment of the present invention.

FIG. 1 is a block diagram for showing the structure of a clock supply circuit according to a first embodiment of the present invention. The clock supply circuit 1 shown in FIG. 1 comprises buffers 11-16, flip flops F1-F4, a toggle flip flop 21, and a selector (multiplexer) 31. The toggle flip flop 21 and the selector 31 constitute a clock gate circuit GC.

Figure 2:
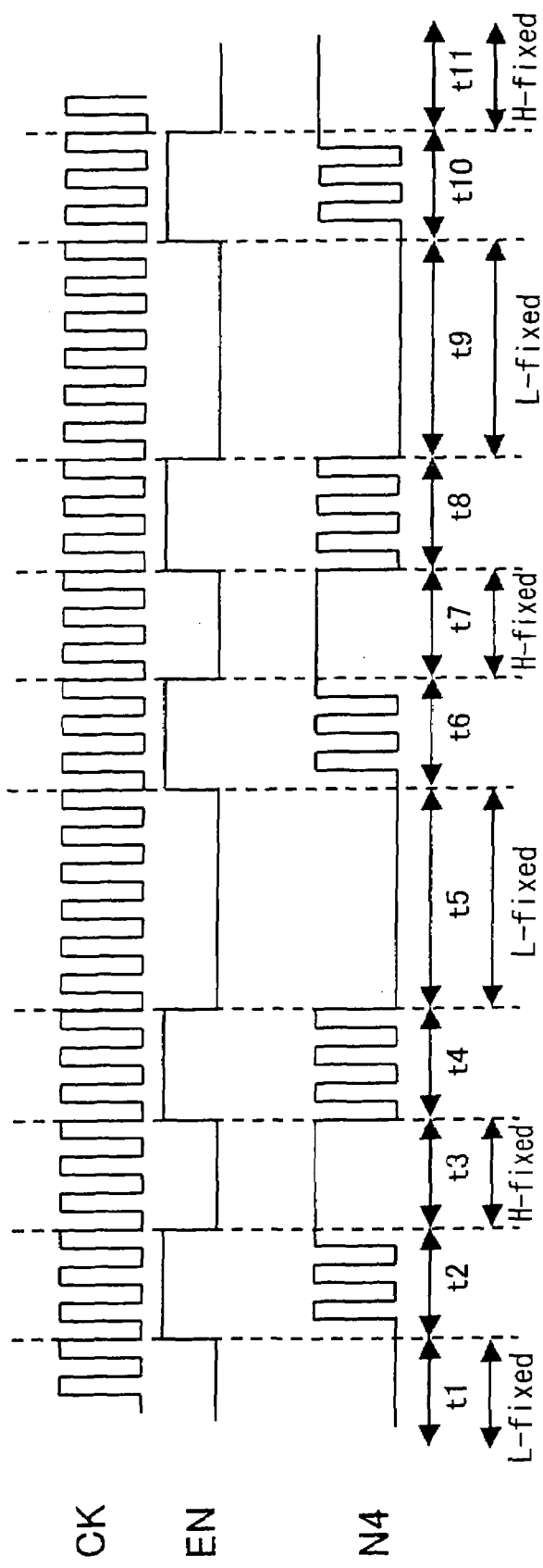
FIG. 2 is a timing chart for showing operation of the clock supply circuit according to the first embodiment of the present invention.

FIG. 2 is a timing chart of the clock supply circuit according to the first embodiment. A clock signal CK and an enabling signal EN are applied to the clock supply circuit 1. The selector 31 of the clock gate circuit GC lets through the clock signal when the enabling signal EN is high level, and lets through an output signal of the toggle flip flop 21 when the enabling signal EN is low level. The toggle flip flop 21 inversely outputs the stored value every rise-transition of the enabling signal.

Regardless of the level (high level or low level) of the enabling signal EN, the clock signal CK is supplied to the flip flops F1 and F2. When the enabling signal EN is high level (period of t2, t4, t6, t8, t10 in FIG. 2), the clock signal CK is also supplied to the flip flops F3 and F4. When the enabling signal EN is low level (period of t1, t3, t5, t7, t9, t11 in FIG. 2), the clock signal CK is not supplied to the buffers 15, 16 and the flip flops F3, F4.

The state of the signal supplied to the buffers 15, 16 and the flip flops F3, F4 is alternately switched between the low-level fixed state and high-level fixed state every time when the clock is gated. The periods of t1, t5, t9 of FIG. 2 are set as the low-level fixed state, and the periods of t3, t7, t11 of FIG. 2 are set as the high-level fixed sate. After a sufficiently long time (to such an extent that an influence of deterioration with time cannot be ignored) has passed, it can be considered that the high-level fixed sate and the low-level fixed state are the same, and the influences of delay deterioration by NBTI exerted on the buffers 13, 14 and the buffers 15, 16 become the same.

As described above, in the embodiment, the buffers to which the supply of the clock signal should be intercepted are not fixed to the same logic level every time, but the high-level fixed state and the low-level fixed state are switched alternately. This allows suppression of clock skew caused due to deterioration of the buffer-structure transistor occurred with time. In this case, a toggle flip flop is simply added to the conventional circuit structure for achieving the gated clock. Thus, the above-described effects can be achieved while suppressing an increase in the area to minimum.

The embodiment is so formed that the output of the toggle flip flop 21 changes when the clock signal CK changes from high level to low level. However, it may be so formed that the output changes when the clock signal CK changes from low level to high level.

Second Embodiment

In the case of the first embodiment described above, as shown in the timing chart of FIG. 4A, the node N4 changes simultaneously with the change of the enabling signal EN when the enabling signal EN changes regardless of the rise and fall of the clock signal CK. Therefore, there are generated error pulses Err1, Err2, and Err3, which are smaller than the pulse width of the original clock signal CK.

Further, when a glitch signal, which temporarily changes and retunes to the original, is added to the enabling signal, the glitch signal propagates on the clock path that is after the selector 31.

Furthermore, in the case where the output of the toggle flip flop 21 changes before the output of the selector 31 is switched to the clock signal CK along the change of the enabling signal EN from the low level to high level, there is a glitch generated in the output of the selector 31. As a result, the flip flops F3, F4 at the end of the paths may malfunction. In addition, an extra electric power is consumed by the buffers included in the paths thereafter. The second embodiment of the present invention deals with the aforementioned shortcomings.

Figure 3:
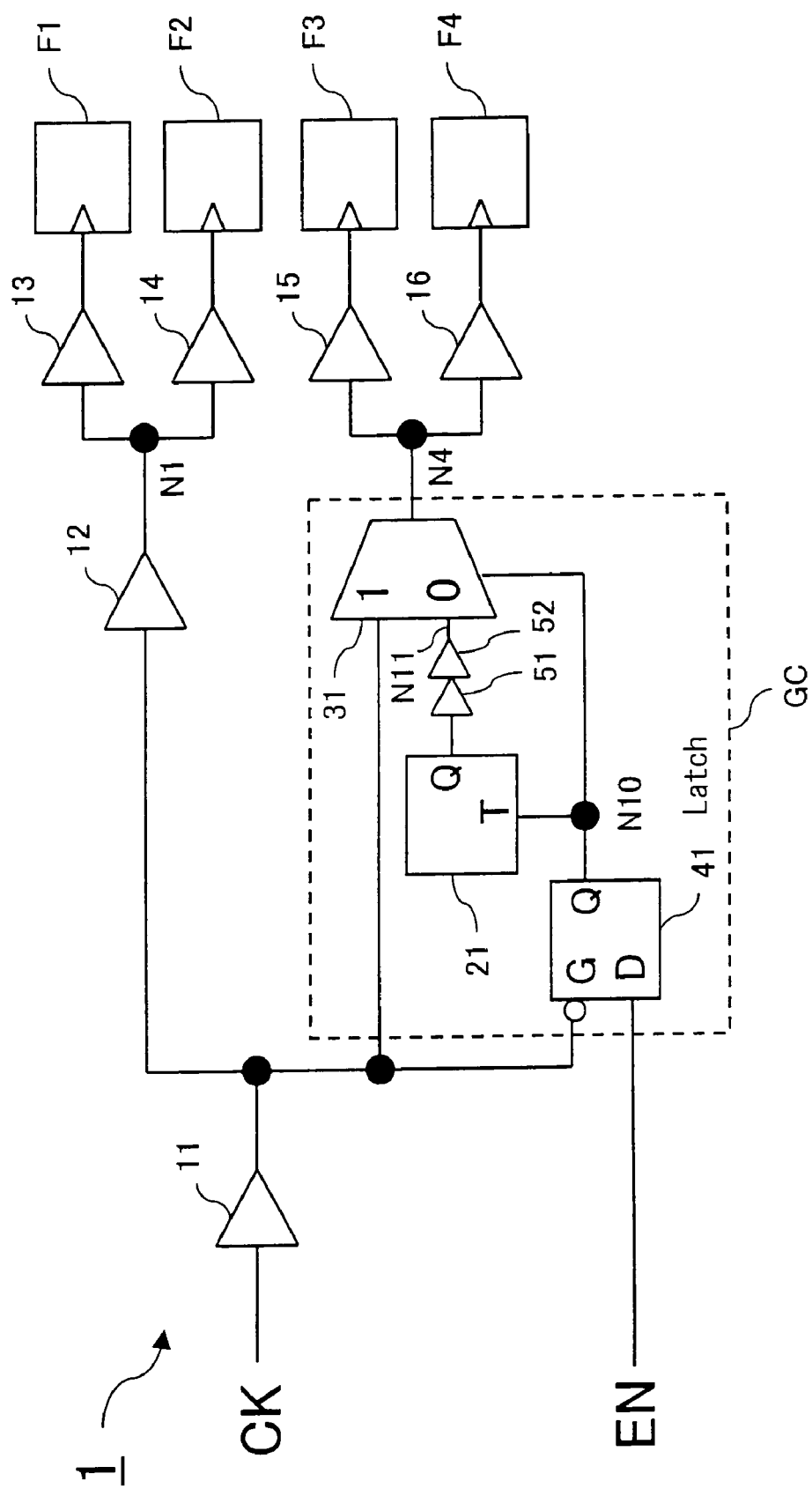
FIG. 3 is a block diagram for showing the structure of a clock supply circuit according to a second embodiment of the present invention.

FIG. 3 is a block diagram for showing the structure of a clock supply circuit according to the second embodiment of the present invention. In FIG. 3, the same reference numerals as those of FIG. 1 of the first embodiment denote the same structural elements, and the detailed description thereof will be omitted.

In the embodiment, the clock gate circuit GC is constituted of a latch 41, a toggle flip flop 21, a selector 31, and delay buffers 51, 52. The latch 41 lets through the enabling signal EN when the clock signal CK is low level and, when the clock signal CK is high level, maintains the value of the enabling signal EN right before the clock signal CK transits from the low level to high level. That is, timing of change in an output node N10 is synchronized with the rise timing of the clock signal CK.

The selector 31 of the clock gate circuit GC lets through the clock signal CK when the output node N10 of the latch 41 is high level, and lets through the output signal of the toggle flip flop 21 when the output node N10 is low level. The toggle flip flop 21 inversely outputs the stored value every rise-transition of the output node N10.

When the signal of the node N10 is high level, the clock signal is also supplied to the flip flops F3 and F4. When the signal of the node N10 is low level, the clock signal is not supplied to the buffers 15, 16 and the flip flops F3, F4.

The state of the signal supplied to the buffers 15, 16 and the flip flops F3, F4 when the clock is gated is alternately switched between the low-level fixed state and high-level fixed state. When it can be considered that the high-level fixed period and the low-level fixed period are the same, the influences of delay deterioration by NBTI exerted on the buffers 13, 14 and the buffers 15, 16 become the same.

Operation of the clock supply circuit according to the embodiment will be described by referring to a timing chart of FIG. 4B. After a change of the enabling signal EN, the output node N10 of the latch 41 changes at a rise timing of the clock signal CK. That is, the latch 41 has the change timing of the output node N10 synchronized with the fall timing of the clock signal CK. As a result, a pulse with same pulse width as that of the original clock signal CK is outputted to the output node N4 of the selector 31. Thereby, malfunction of the flip flops F3 and F4 can be prevented.

Further, by providing the delay buffers 51, 52 on the clock paths after the selector 31, it is possible to prevent extra consumption of electric power and the malfunction of the flip flops even if a glitch signal is generated on the enabling signal when the clock signal CK is high level.

Furthermore, by setting the sum of the delay time of the delay buffers 51, 52 and that of the toggle flip flop 21 to be the delay time of the selector 31 or more, output of the toggle flip flop 21 outputted after a change in the output of the selector 31 is applied to the selector 31. With this, there is no glitch to be generated. As a result, it is possible to prevent an extra consumption of electric power by the buffers included on the clock paths after the selector 31 and malfunction of the flip flops.

As described above, in the embodiment, state of the buffers to which supply of the clock signal should be intercepted is alternately switched between the high-level fixed state and the low-level fixed state. This allows suppression of clock skew caused due to deterioration of the buffer-structure transistor occurred with time. Furthermore, generation of the glitches after the selector 31 can be prevented, so that an extra consumption of electric power by the buffer included on the clock paths thereafter and malfunction of the flip flops can be prevented.

Third Embodiment

Figure 5:
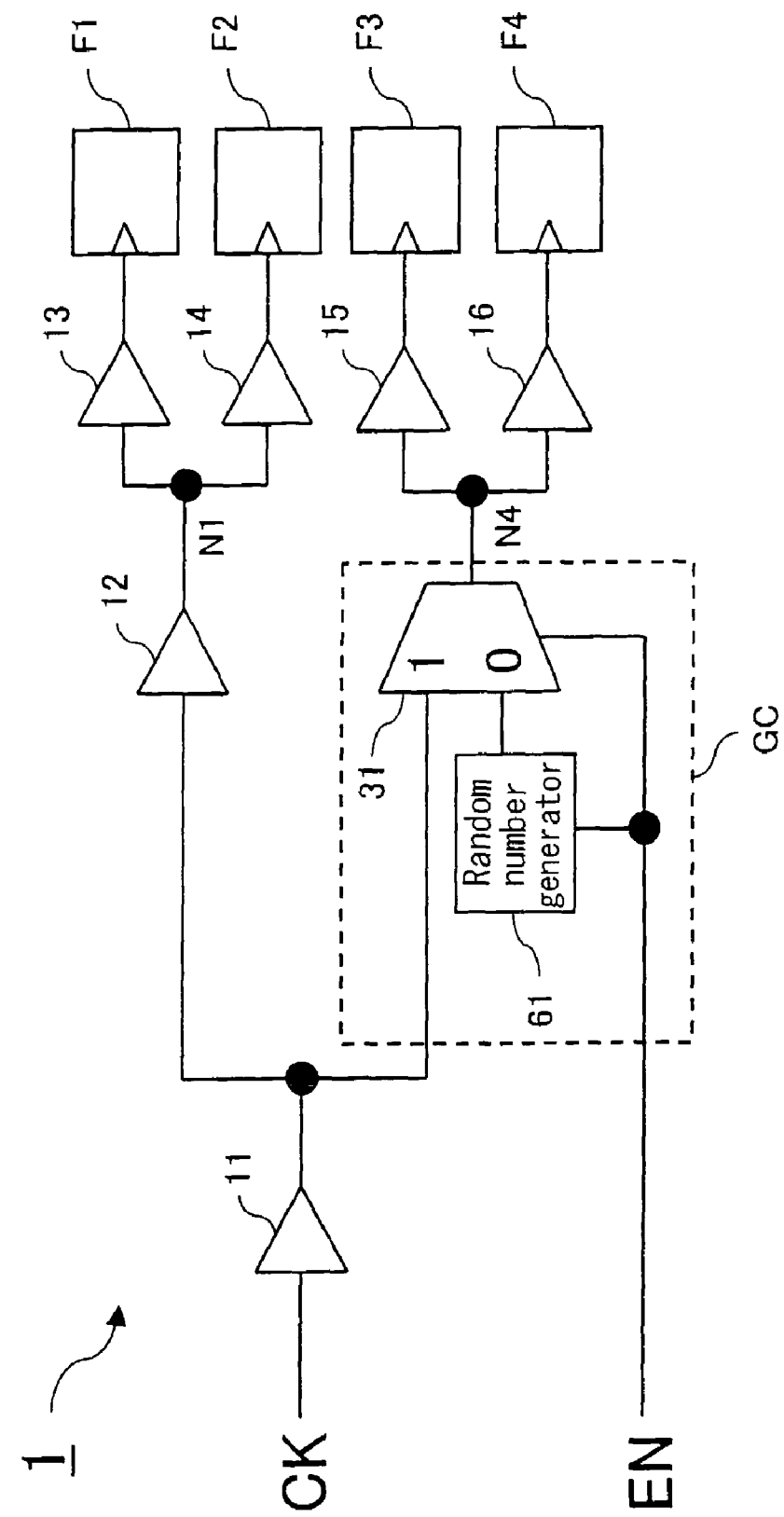
FIG. 5 is a block diagram for showing the structure of a clock supply circuit according to a third embodiment of the present invention.

FIG. 5 is a block diagram for showing the structure of a clock supply circuit according to the third embodiment of the present invention. In FIG. 5, the same reference numerals as those of FIG. 1 of the first embodiment denote the same structural elements, and the detailed description thereof will be omitted.

In the embodiment, the clock gate circuit GC is constituted of a random number generator 61 and a selector 31. The random number generator 61 randomly generates the high level and low level in accordance with a change in the enabling signal EN. It is considered that the number of high level and that of low level generated by the random number generator 61 after a certain period become almost the same. When it can be considered that the high-level fixed period and the low-level fixed period are the same, the influences of delay deterioration by NBTI exerted on the buffers 13, 14 and the buffers 15, 16 become the same.

As described above, in the embodiment, state of the buffers to which supply of the clock signal should be intercepted is randomly switched between the high-level fixed state and the low-level fixed state. This allows suppression of clock skew caused due to deterioration of the buffer-structure transistor occurred with time.

Fourth Embodiment

Figure 6:
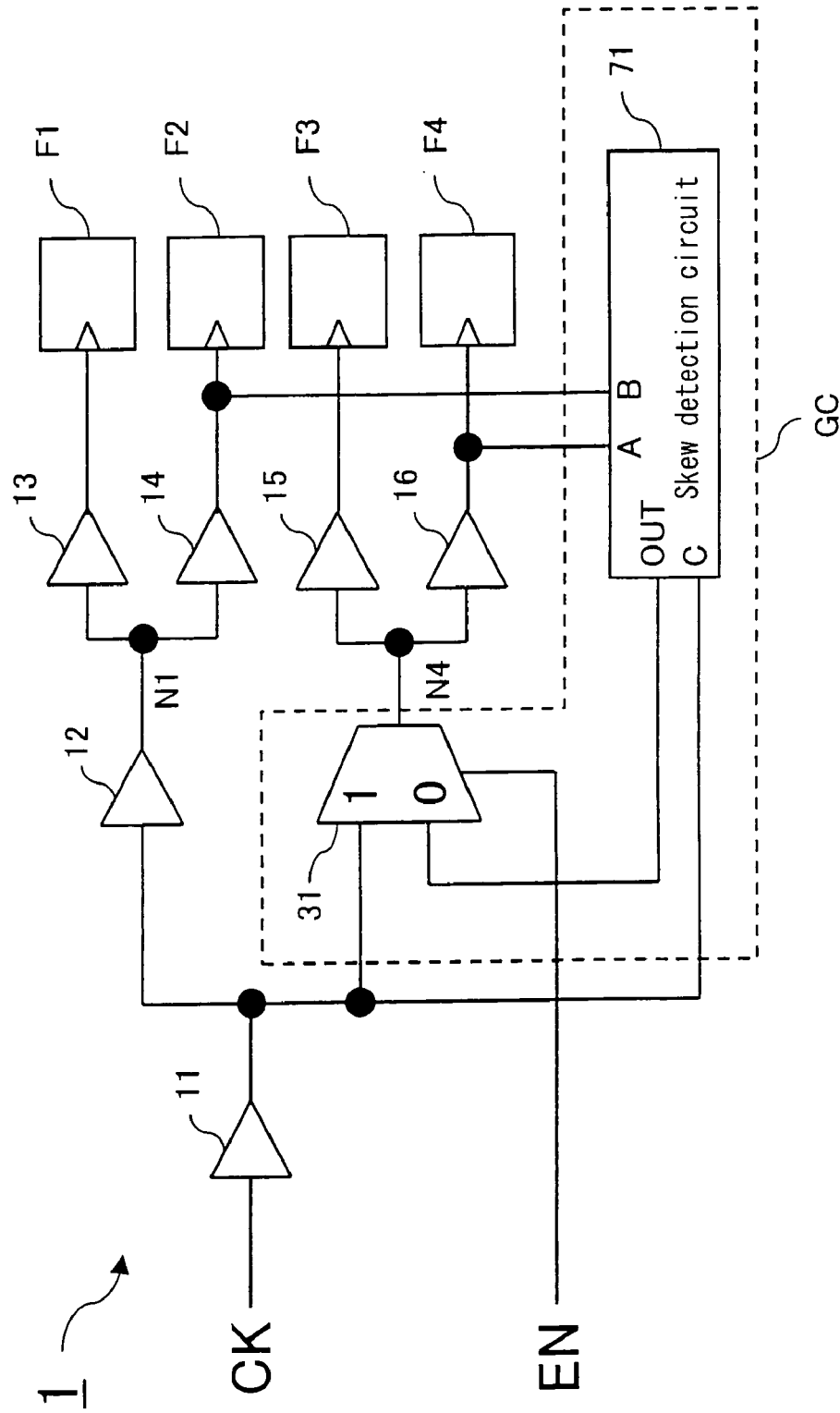
FIG. 6 is a block diagram for showing the structure of a clock supply circuit according to a fourth embodiment of the present invention.

FIG. 6 is a block diagram for showing the structure of a clock supply circuit according to the fourth embodiment of the present invention. In FIG. 6, the same reference numerals as those of FIG. 1 of the first embodiment denote the same structural elements, and the detailed description thereof will be omitted.

In the embodiment, the clock gate circuit GC is constituted of a skew detection circuit 71 and a selector 31. The skew detection circuit 71 detects clock skews between the flip flop 2 to which the clock signal CK is constantly supplied and the flip flop 4 to which the clock signal CK is gated.

Figure 7:
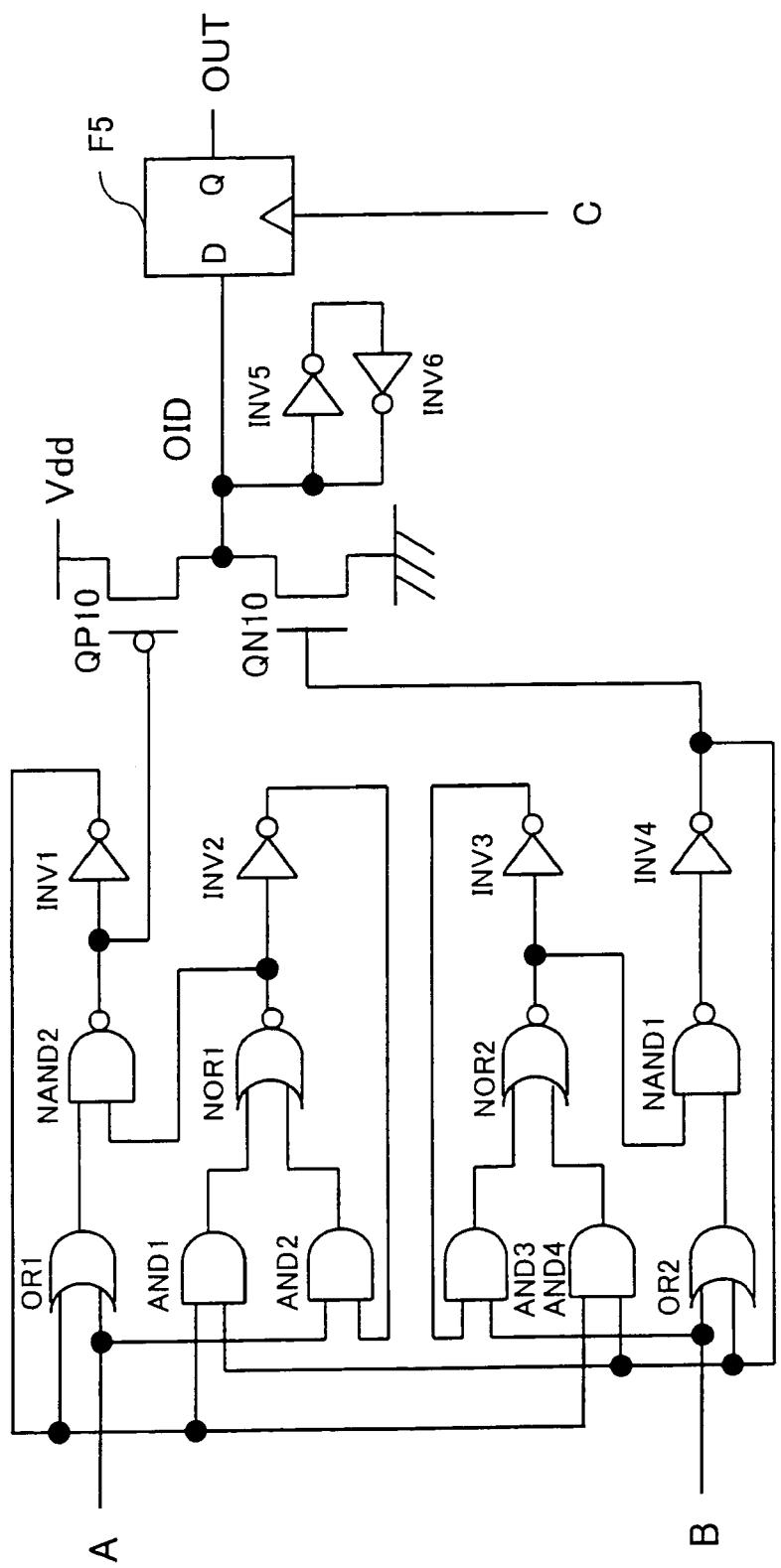
FIG. 7 is a block diagram for showing the structure of a skew detection circuit according to the fourth embodiment of the present invention.

FIG. 7 shows the circuit structure of the skew detection circuit 71. This is a case where it is constituted of a known circuit that is generally used in a PLL (phase locked loop) and the like. Reference codes A, B, C are input signals, OUT is an output signal, OID is an internal signal, OR1, OR2 are OR circuits, NAND1, NAND2 are NAND circuits, AND1-AND4 are AND circuits, NOR1, NOR2 are NOR circuits, INV1-INV6 are inverter circuits, and F5 is a flip flop. QP10 is a PMOS transistor and QN10 is an NMOS transistor.

FIG. 8 shows a timing chart of the skew detection circuit 71 shown in FIG. 7. When the rise-transition of the input signal A is earlier than that of the input signal B, low level is outputted to the internal node OID. When the rise-transition of the input signal A is later than that of the input signal B, high level is outputted to the internal node OID. Further, a signal of the internal node OID is outputted to the output OUT in accordance with the rise timing of the input signal C.

Upon receiving the clock signal CK supplied to the gated part, the skew detection circuit 71 outputs the detected skew according to the timing. Based on the value of the detected skew, the fixed logic level of the clock is changed in such a manner that the extent of the delay deterioration of the buffers 13, 14 and the extent of delay deterioration due to NBTI become the same. This point will be described in detail hereinafter.

Figure 17:
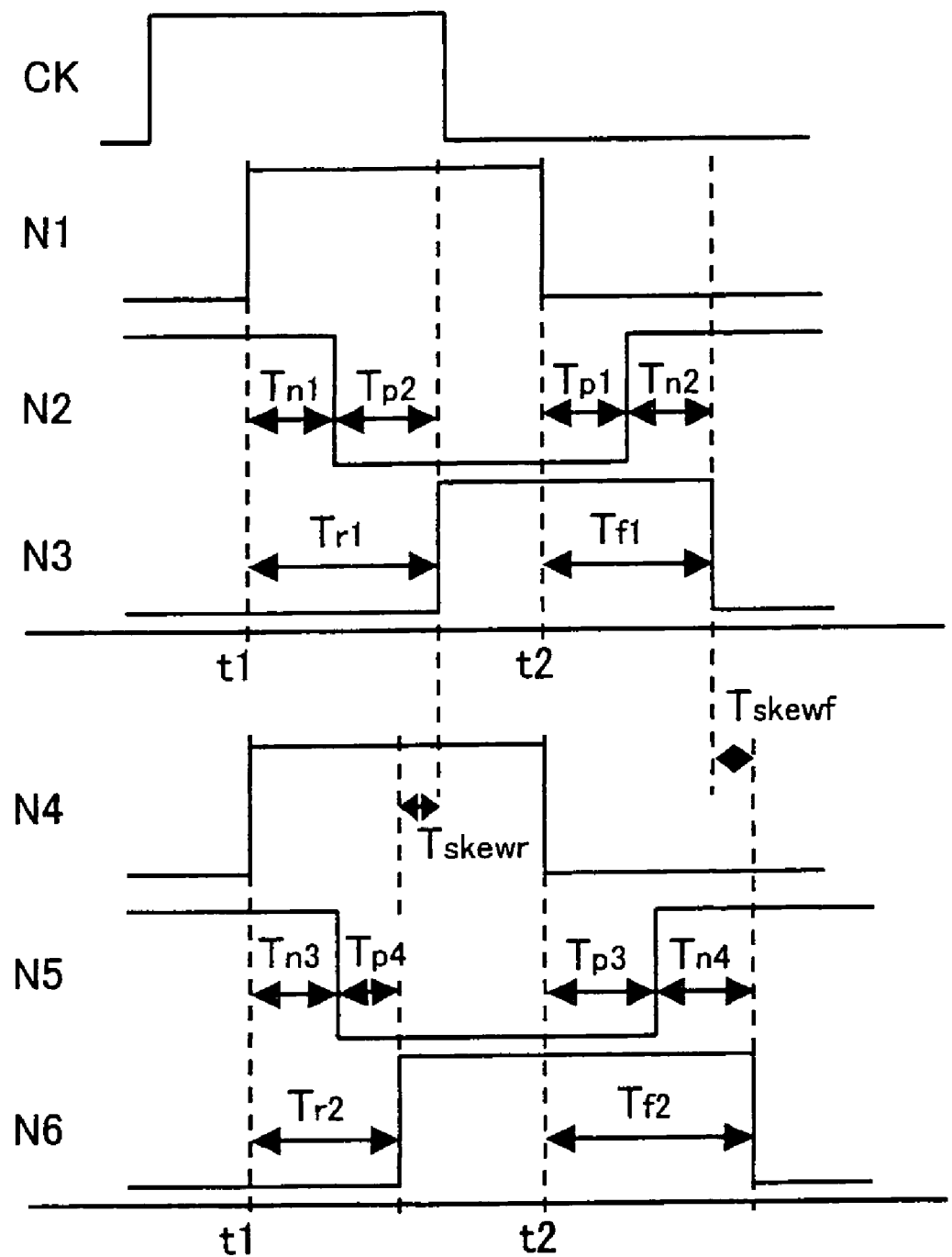
FIG. 17 is a timing chart for showing operation of the conventional clock supply circuit.

As shown in FIG. 17, when the input of the buffer is fixed to the low level, the rise delay time Tr2 becomes smaller than the case where the clock is constantly applied. Meanwhile, when the input of the buffer is fixed to the high level, the rise delay time Tr2 becomes larger than the case where the clock is constantly applied. Therefore, for stopping the clock in the case where the signal arrival time for the flip flop F2 is later than the signal arrival time for the flip flop F4, the input of the buffer is fixed to the low level. Inversely, when the clock is gated in the case where the signal arrival time for the flip flop F2 is earlier than the signal arrival time for the flip flop F4, the input of the buffer is fixed to the high level. With this, it is possible to suppress clock skew caused due to deterioration of the buffer-structure transistor occurred with time.

As described above, in the embodiment, the buffers to which supply of the clock signal should be intercepted is fixed to the signal level in the direction by which the clock skew due to the deterioration with time becomes smaller. This allows suppression of clock skew caused due to deterioration of the buffer-structure transistor occurred with time.

In the embodiment, the skew detection clock is formed to receive the clock signal CK inputted to the gated part and to achieve output in accordance with the timing thereof. However, the delay difference between the skew detection circuit 71 and the clock gate circuit GC is small, it may be aligned with the timing of the clock signal CK supplied to the flip flop.

Fifth Embodiment

Figure 9:
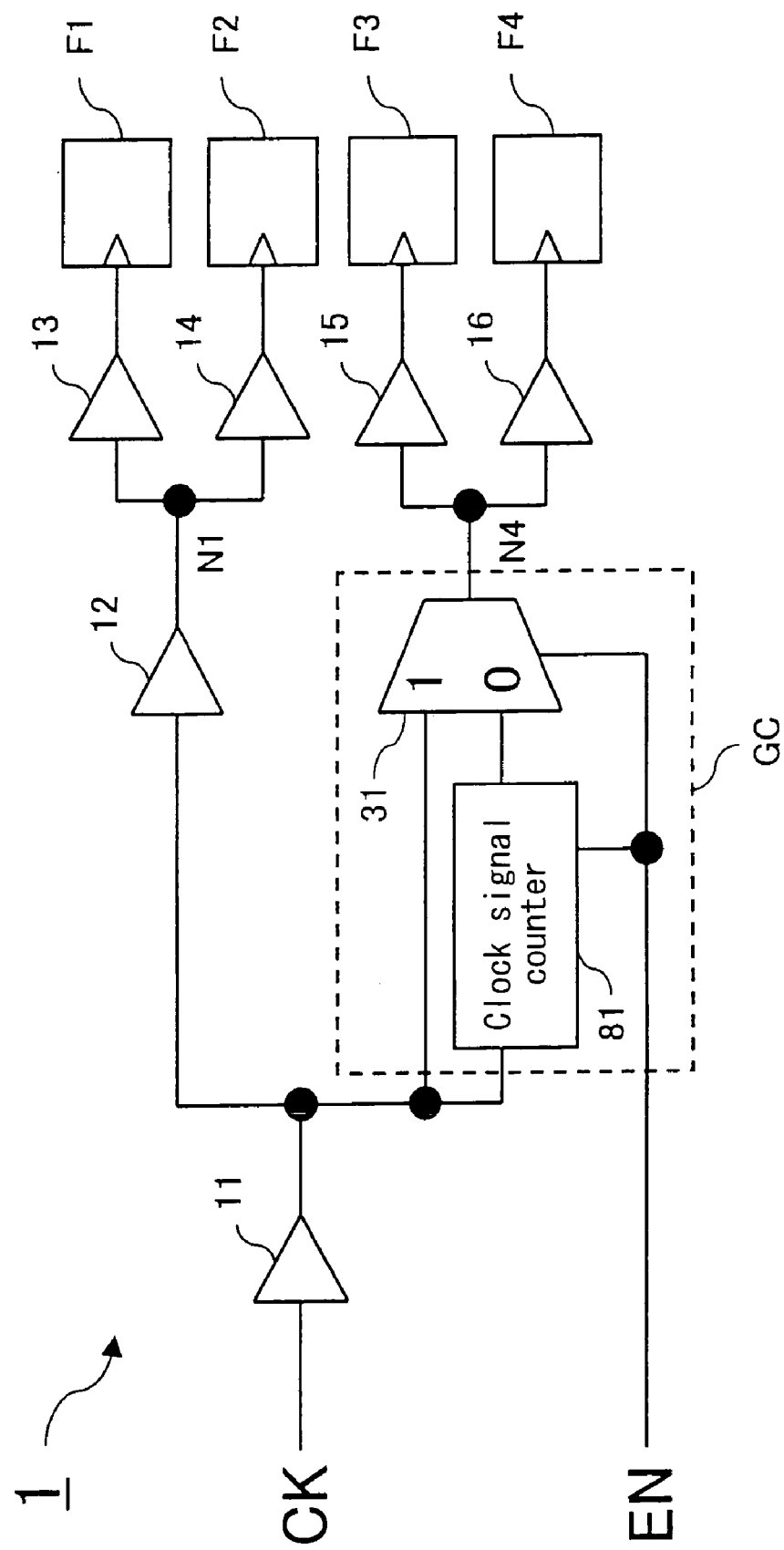
FIG. 9 is a block diagram for showing the structure of a clock supply circuit according to a fifth embodiment of the present invention.

FIG. 9 is a block diagram for showing the structure of a clock supply circuit according to the fifth embodiment of the present invention. In FIG. 9, the same reference numerals as those of FIG. 1 of the first embodiment denote the same structural elements, and the detailed description thereof will be omitted.

In the embodiment, the clock gate circuit GC is constituted of a clock signal counter 81 and a selector 31. The clock signal counter 81 counts the pulse number of the clock signal CK that is applied while the enabling signal EN is the low-level period, and inverses the output every time the count reaches a specific value. With this, the high-level period and the low-level period become almost the same. As a result, the influences of delay deterioration by NBTI exerted on the buffers 13, 14 and the buffers 15, 16 become the same.

As described above, in the embodiment, state of the buffers to which supply of the clock signal should be intercepted is alternately switched between the high-level fixed state and the low-level fixed state for the same period. This allows suppression of clock skew caused due to deterioration of the buffer-structure transistor occurred with time.

In the structure of the embodiment described above, there is generated transition, i.e. rise-transition of the clock, when the flip flops F3 and F4 are in action. However, it is not a trouble because in many cases it is not necessary to maintain the state in the circuit that is gated for a long time. In the cases where the flip flops are not allowed to be in action while being gated, it is designed to use a flip flop with a hold function for the flip flop to be gated so that it does not operate while being gated.

Furthermore, in the embodiment, the high-level fixed period and the low-level fixed period are set uniform by counting the pulse number of the clock signal CK. However, instead of the counter, a timer mounted to the semiconductor integrated circuit or time information supplied from outside may be used for equalizing the high-level fixed period and the low-level fixed period.

Sixth Embodiment

Figure 10:
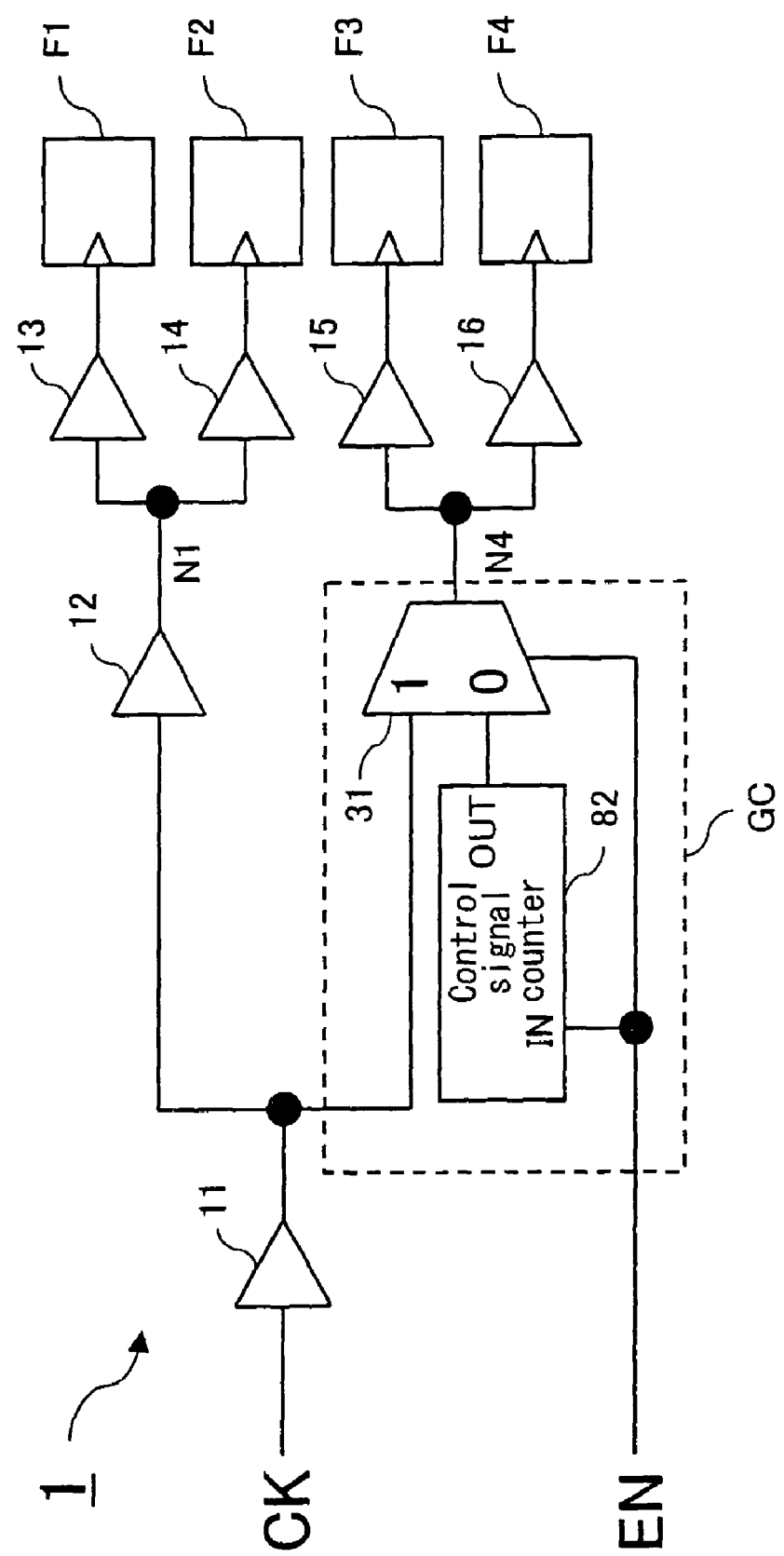
FIG. 10 is a block diagram for showing the structure of a clock supply circuit according to a sixth embodiment of the present invention.

FIG. 10 is a block diagram for showing the structure of a clock supply circuit according to the sixth embodiment of the present invention. In FIG. 10, the same reference numerals as those of FIG. 1 of the first embodiment denote the same structural elements, and the detailed description thereof will be omitted.

In the embodiment, the clock gate circuit GC is constituted of a 2-bit control signal counter 82 and a selector 31. The control signal counter 82 counts the pulse number of the enabling signal EN and inverses the output every detection of two pulses. With this, the high-level period and the low-level period become the same on a long-period basis even if there is a periodicity for the period where the enabling signal EN becomes low level. As a result, the influences of delay deterioration by NBTI exerted on the buffers 13, 14 and the buffers 15, 16 become the same.

Figure 11:
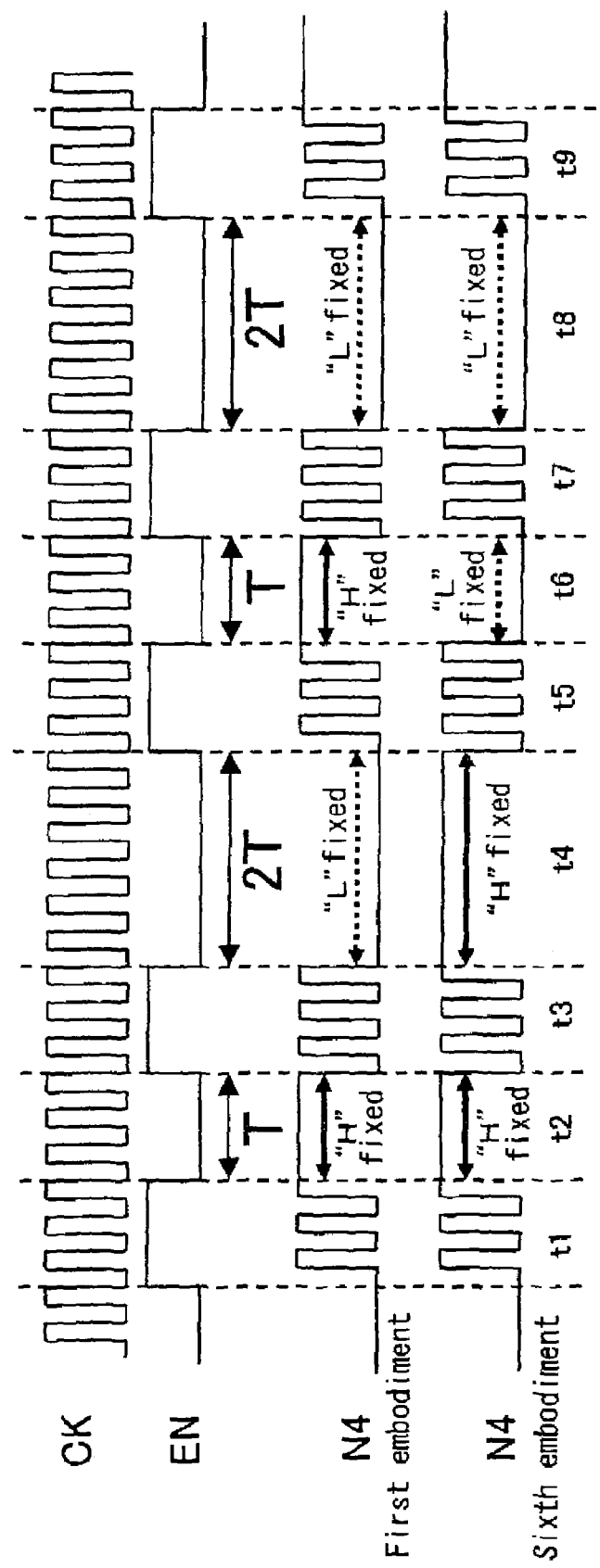
FIG. 11 is a timing chart for showing operation of the clock supply circuit according to the sixth embodiment of the present invention.

This point will be described in detail hereinafter by referring to a timing chart of FIG. 11. The enabling signal EN is in low level for a specific period T. When the enabling signal EN changes to low level for the next time, it is in low level for a specific period 2T, and for the next change and thereafter, it repeats these actions and becomes low level for the specific time T. At this time, in the clock supply circuit of FIG. 1 according to the first embodiment, the high-level fixed period of the node N4 as the input of the buffers 15 and 16 is a total of 2T, and the low-level fixed period is 4T. After a long period, the input of the buffers 15 and 16 differs for the low-level fixed period and for the high-level fixed period. As a result, the influences of delay deterioration by NBTI exerted on the buffers 13, 14 and the buffers 15, 16 become different.

On the contrary, in the clock supply circuit of FIG. 10 according to the sixth embodiment, the high-level fixed period of the node N4 as the input of the buffers 15 and 16 is 3T, and the low-level fixed period is equal to the high-level fixed period 3T. Therefore, after a long period, the low-level fixed period and the high-level fixed period in the input of the buffers 15 and 16 become equal. As a result, the influences of delay deterioration by NBTI exerted on the buffers 13, 14 and the buffers 15, 16 become equal.

As described above, in the embodiment, state of the buffers to which supply of the clock signal should be intercepted is alternately switched between the high-level fixed state and the low-level fixed state every time the enabling signal changes for several times. This allows suppression of clock skew caused due to deterioration of the buffer-structure transistor occurred with time. Further, it is possible to suppress the clock skew caused by deterioration with time even if there is a periodicity in the period where the clock is fixed.

When there is a higher-order periodicity in the enabling signal EN, the same effects as those described above can be achieved by increasing the bit number of the counter.

Seventh Embodiment

There may be a case where, for example, an apparatus, which comprises a semiconductor integrated circuit including a clock supply circuit with a gated clock function, stops the clock continuously after a supply of electric power to the semiconductor integrated circuit. Under that condition, the input levels of the buffers 15 and 16 are fixed to the same logic level every time in the embodiments 1-3 and the embodiment 6. This increases the clock skews caused due to deterioration of the buffer-structure transistor occurred with time. The seventh embodiment of the present invention is designed to deal with such inconvenience.

Figure 12:
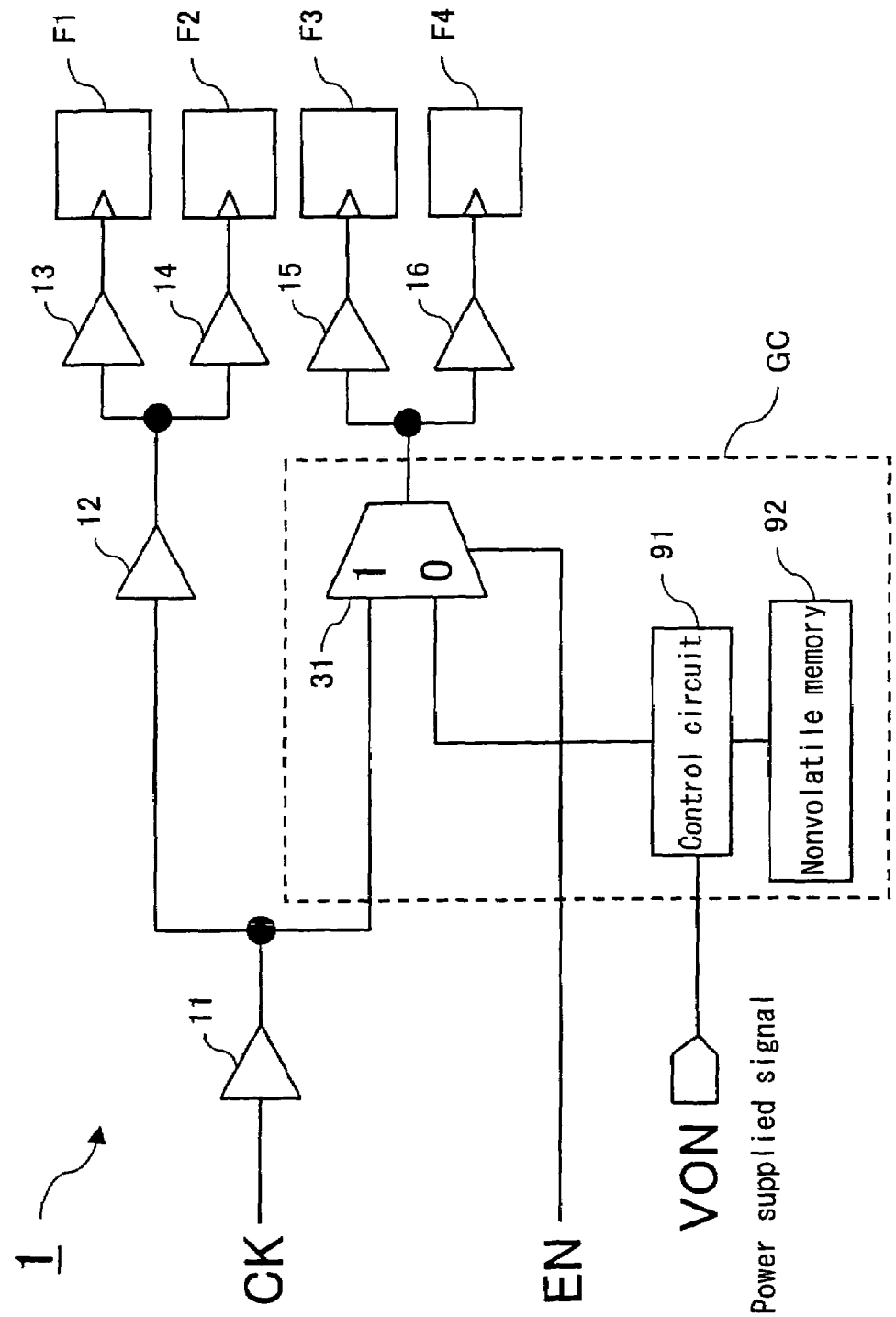
FIG. 12 is a block diagram for showing the structure of a clock supply circuit according to a seventh embodiment of the present invention.

FIG. 12 is a block diagram for showing the structure of a clock supply circuit according to the seventh embodiment of the present invention. In FIG. 12, the same reference numerals as those of FIG. 1 of the first embodiment denote the same structural elements, and the detailed description thereof will be omitted. In the embodiment, the clock gate circuit GC is constituted of a control circuit 91, a nonvolatile memory 92, and a selector 31. Upon receiving a power supplied signal VON for notifying that power is supplied to the semiconductor integrated circuit, the control circuit 91 supplies a signal to the selector 31 depending on the state at the time of receiving a previous power supplied signal VON that is recorded to the nonvolatile memory 92. When the power supplied signal VON is applied, content of the nonvolatile memory 92 is rewritten. The fixed level is changed by ever supply of power even in the case, for example, where the clock is stopped continuously after a supply of power to the semiconductor integrated circuit.

As described above, in the embodiment, state of the buffers to which supply of the clock signal should be intercepted is alternately switched between the high-level fixed state and the low-level fixed state every time the power is supplied. This allows suppression of clock skew caused due to deterioration of the buffer-structure transistor occurred with time even in the case where, for example the clock is continuously stopped after a supply of power to the semiconductor integrated circuit, since the fixed level is changed every time the power is supplied.

Eighth Embodiment

Figure 13:
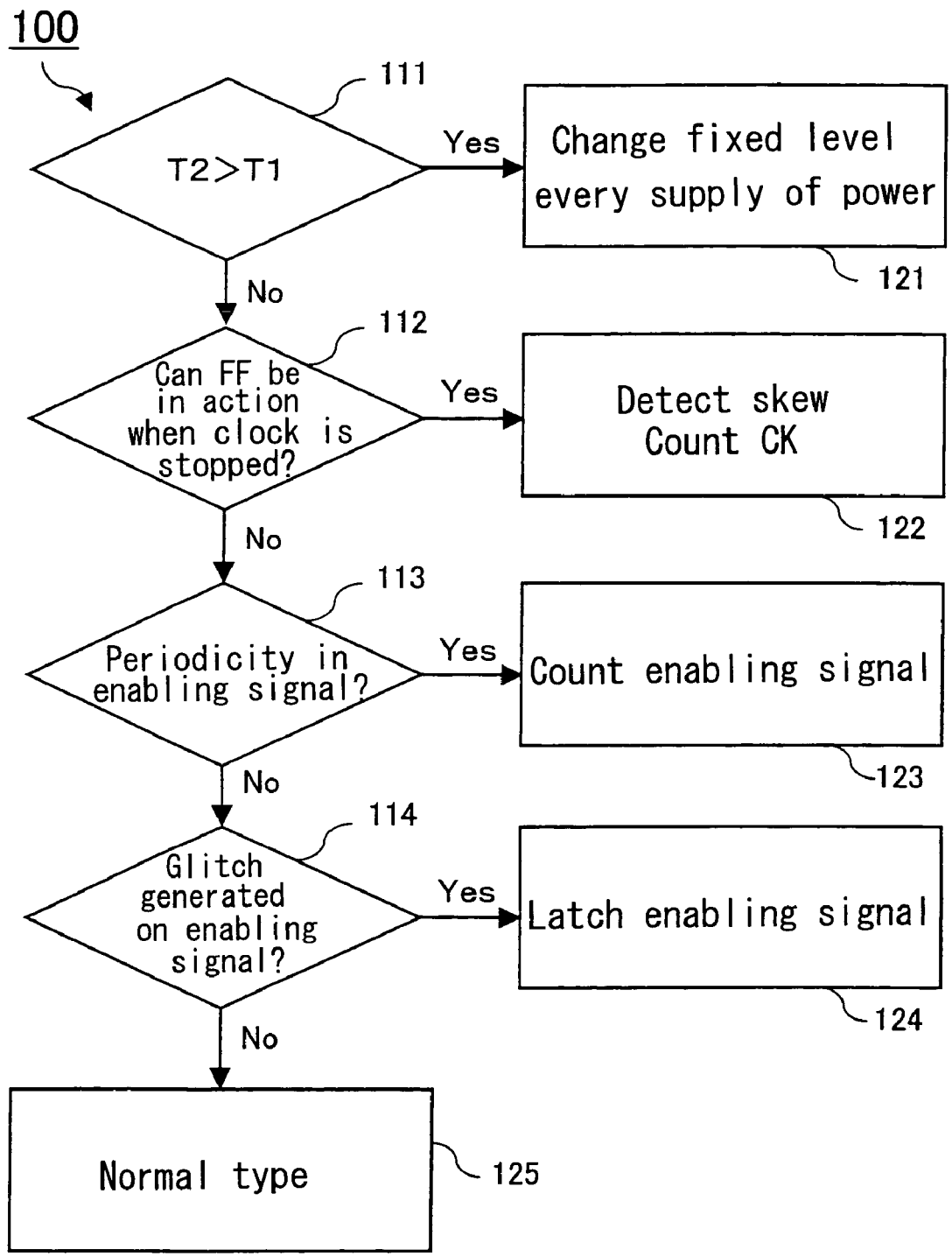
FIG. 13 is a flowchart for showing the order of a semiconductor system designing method according to an eighth embodiment of the present invention.

FIG. 13 is a flowchart for showing a designing method of a semiconductor system according to an eighth embodiment of the present invention. The semiconductor system designed by the designing method of the embodiment comprises clock supply paths that branch a clock signal and supply each of the branched clock signals to a plurality of sequential circuits via buffers, and at least two clock supply circuits. The clock supply circuit comprises a clock gate circuit disposed on the clock supply paths.

First, there is performed a step of disposing, as the clock supply circuits, a plurality of clock circuits of different kinds which are selected from the clock supply circuits described in the first-seventh embodiments. In the eighth embodiment, the clock supply circuits of the first-fifth embodiments are disposed by way of example.

The first clock circuit is constituted of the clock supply circuit according to the seventh embodiment. The second clock supply circuit is constituted of the clock supply circuit according to the fourth or fifth embodiment. The third clock supply circuit is constituted of the clock supply circuit according to the sixth embodiment, and the fourth clock supply circuit is constituted of the clock supply circuit according to the second embodiment. The fifth clock supply circuit is constituted of the clock supply circuit according to the first or third embodiment.

Then, steps 111-114 are performed for selecting the clock supply circuit in accordance with the applied frequency of control signals per unit time, whether or not the sequential circuit is allowed to operate during a period where the clock signal is mainly gated, whether or not there is a periodicity in the control signal, and whether or not there is temporary transition for the control signal.

In the description provided below, an average period for supplying the power to the semiconductor system comprising the clock supply circuits is T1, and an average cycle of changes of the enabling signal EN applied to the clock supply circuits is T2.

First, in the first selecting step 111, it is judged whether or not the average cycle T2 is larger than the assumed average period T1 (T2>T1). The assumed average period T1 is a period where power is supplied to the semiconductor system to which the clock supply circuits are mounted. The average cycle T2 is the average value of the cycles by which the enabling signal EN applied to the clock supply circuit changes.

When the result of judgment in the first selecting step 111 is Yes, the first clock supply circuit (the clock circuit shown in the seventh embodiment) is selected. As a result, processing of the step 121 is carried out.

In the meantime, when the result of judgment in the first selecting step 111 is No, it proceeds to the second selecting step 112. When the enabling signal EN is low level and mainly the input levels of the buffers 15, 16 are fixed, it is judged in the second selecting step 112 whether or not the flip flops F3 and F4 are allowed to operate on the system. When the result of judgment in the second selecting step 112 is Yes, the second clock supply circuit (the clock supply circuit of the fourth or fifth embodiment) is selected. As a result, processing of the step 122 is carried out.

When the result of judgment in the second selecting step 112 is No, it proceeds to the third selecting step 113. When the result of judgment in the third selecting step 113 is Yes, the third clock supply circuit (the clock supply circuit of the sixth embodiment) is selected. As a result, processing of the step 123 is carried out.

When the result of judgment in the third selecting step 113 is No, it proceeds to the fourth selecting step 114. In the fourth step 114, it is judged whether or not there is a possibility of generating a transitionally changing signal (glitch) on the enabling signal EN. When the result of judgment in the fourth selecting step 114 is Yes, the fourth clock supply circuit (the clock supply circuit of the second embodiment) is selected. As a result, processing of the step 124 is carried out.

In the meantime, when the result of judgment in the fourth selecting step 114 is No, the fifth clock supply circuit (the clock supply circuit of the first or third embodiment) is selected. As a result, processing of the step 125 is carried out.

As described above, with the designing method of the semiconductor system according to this embodiment, it is possible to select the optimum clock supply circuit structure in accordance with judgments, i.e. whether or not there is a cycle or glitch of the enabling signal, whether or not the operation of the flip flops is allowed during the period where the clock is gated, etc. Thereby, it is possible to design the semiconductor system in which the clock skews caused due to deterioration of the buffer-structure transistor occurred with time can be suppressed. In addition, the circuit area can be reduced.

Ninth Embodiment

Figure 14:
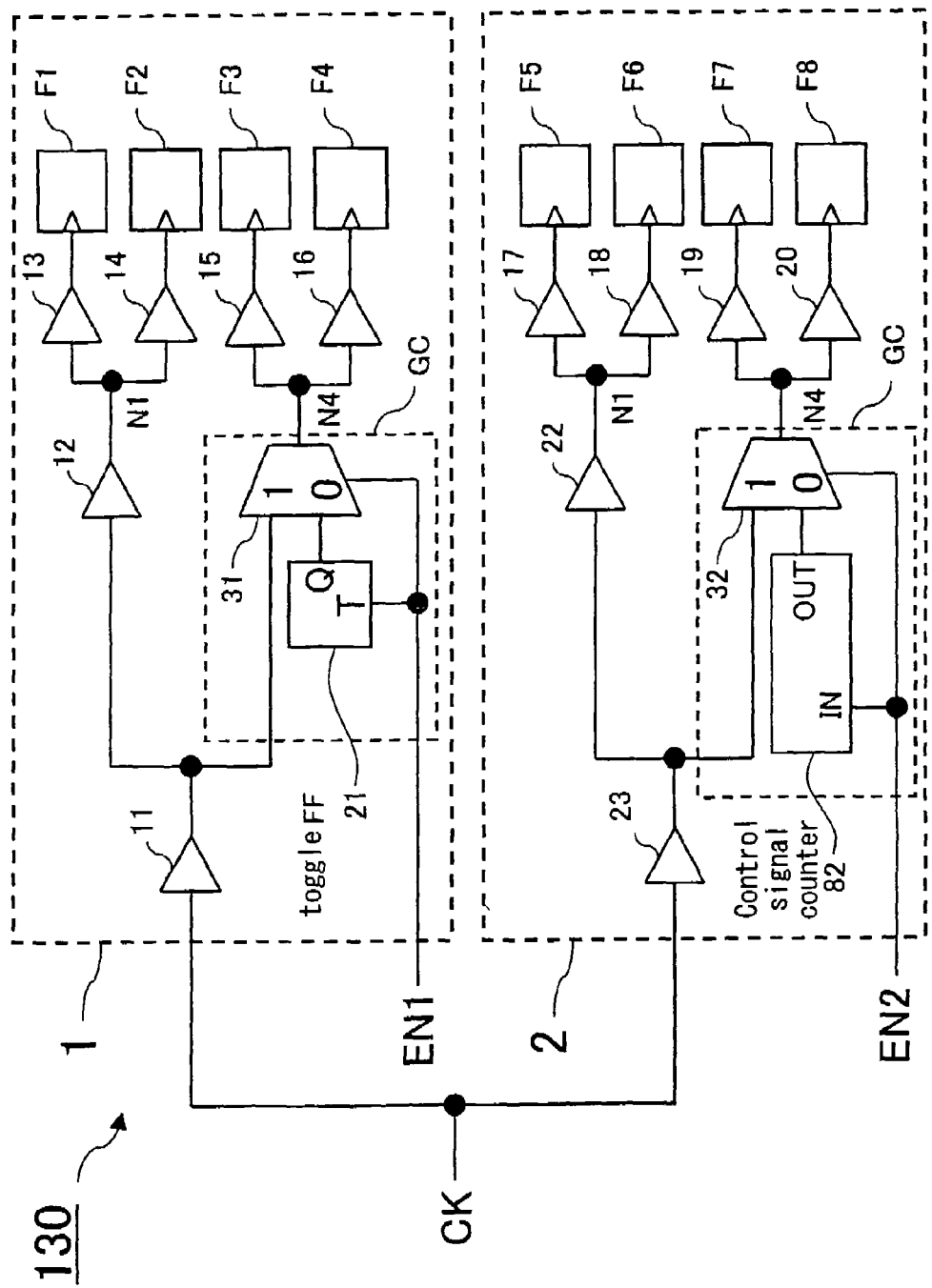
FIG. 14 is a block diagram for showing the structure of a semiconductor system according to a ninth embodiment of the present invention.
Figure 15:
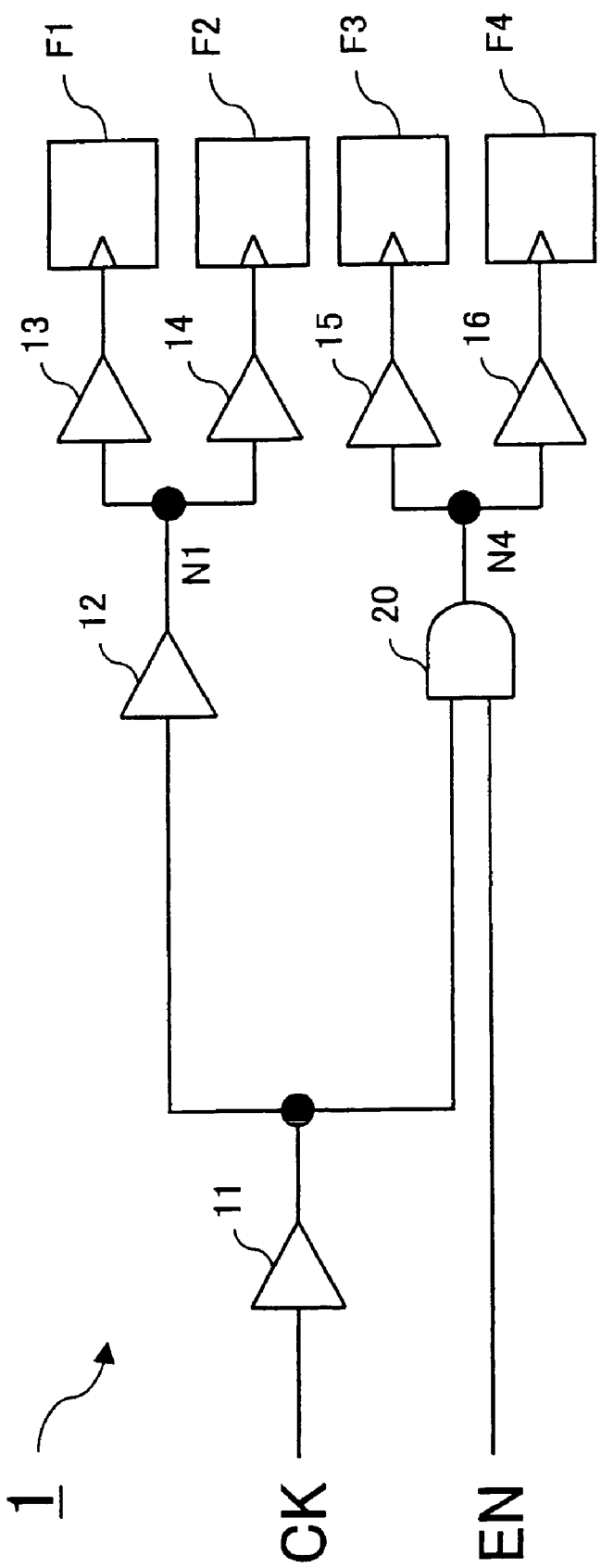
FIG. 15 is a block diagram for showing the structure of a conventional clock supply circuit.
Figure 16:
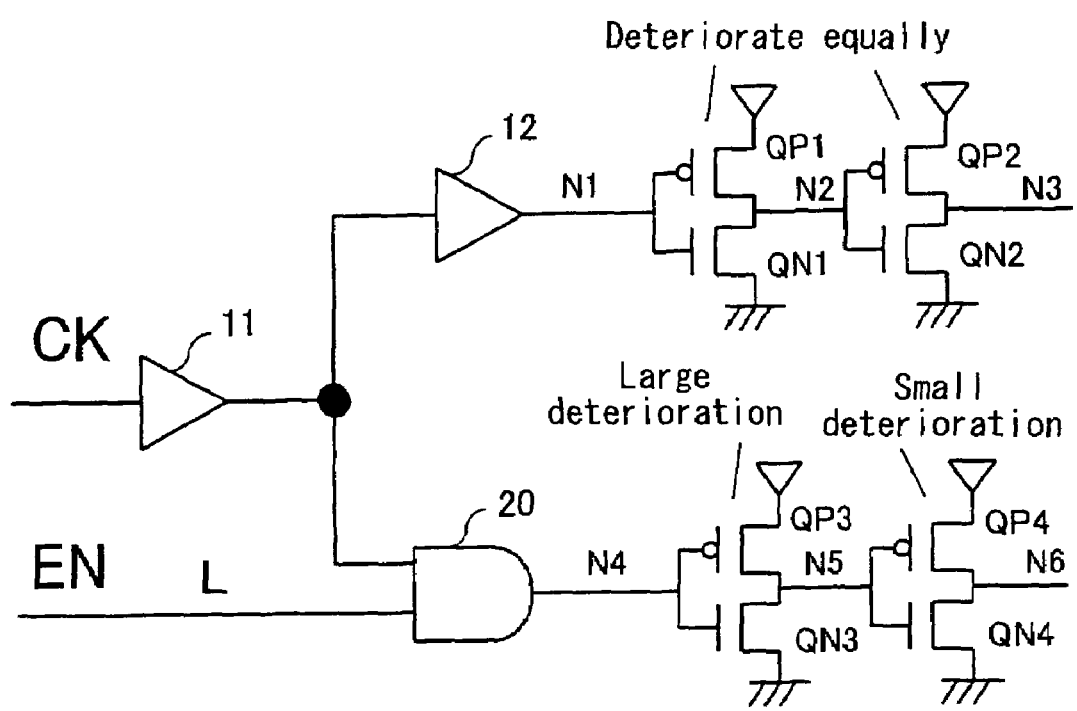
FIG. 16 is a block diagram for showing the structure of a conventional clock supply circuit.

FIG. 14 is an illustration for showing the structure of a semiconductor system according to a ninth embodiment of the present invention. This semiconductor system 130 comprises clock supply circuits 1, 2, buffers 11-20, 22, 23, flip flops F1-F8, a toggle flip flop 21, selectors 31, 32, and a control signal counter 82.

An enabling signal EN1 changes by synchronizing with the fall of the clock signal CK, which is also a signal with no periodicity. Further, an enabling signal EN2 changes by synchronizing with the fall of the clock signal CK, which is also a signal with a periodicity as the enabling signal EN shown in FIG. 11. In this case, the circuit shown in the first embodiment is used for the clock supply circuit 1 that is controlled by the enabling signal EN1, and the circuit shown in the sixth embodiment is used for the clock supply circuit 2 that is controlled by the enabling signal EN2.

In general, the control signal counter 82 is constituted of two toggle flips. Thus, the clock supply circuit shown in the first embodiment can be formed with a smaller circuit than the clock supply circuit shown in the sixth embodiment. Accordingly, it requires a small chip area. Therefore, by selecting the structure of the clock supply circuit in accordance with the characteristic of the enabling signal EN, it is possible to reduce the chip area than forming all the clock supply circuits with the circuit of the sixth embodiment, for example.

As described above, the semiconductor system according to the embodiment is formed by mounting a plurality of optimum clock supply circuits in accordance with judgments, i.e. whether or not there is a cycle or glitch of the enabling signal, whether or not the operation of the flip flops is allowed during the period where the clock is gated, etc. Thereby, it is possible to design the semiconductor system in which the clock skews caused due to deterioration of the buffer-structure transistor occurred with time can be suppressed. In addition, the circuit area can be reduced.

The present invention has been described in detail by referring to the most preferred embodiments. However, various combinations and modifications of the components are possible without departing from the spirit and the broad scope of the appended claims.

What is claimed is:

1. A clock supply circuit, comprising:
    a plurality of clock supply paths for branching a clock signal and supplying each of said branched clock signals to a plurality of sequential circuits via a buffer; and
    a clock gate circuit inserted at least to one of said clock supply paths, which lets through said clock signals when a control signal is in a first logic state and, when said control signal is in a second logic state, outputs an inversion signal of a logic level that is outputted in a previous occasion where said control signal in said second logic state is applied.

2. The clock supply circuit according to claim 1, wherein said clock gate circuit comprises:
    a toggle flip flop for inverting output every time logic of said control signal is either rising of falling; and
    a selector for selectively outputting either said clock signal or output of said toggle flip flop in accordance with said logic of said control signal.

3. The clock supply circuit according to claim 2, wherein:
    said selector selectively outputs said clock signal when said control signal is high level, and selectively outputs said output of said toggle flip flop when said control signal is low level; and
    said toggle flip flop inversely outputs a stored signal of said toggle flip flop when said control signal rises.

4. The clock supply circuit according to claim 2, wherein:
    said selector selectively outputs said clock signal when said control signal is low level, and selectively outputs said output of said toggle flip flop when said control signal is high level; and
    said toggle flip flop inversely outputs a stored signal of said toggle flip flop when said control signal falls.

5. The clock supply circuit according to claim 2, further comprising a delay element for delaying to output a signal, which is inserted between an output terminal of said toggle flip flop and a data input terminal of said selector.

6. The clock supply circuit according to claim 5, wherein delay time of said delay element is set longer than a difference between delay time by which said signal propagates from a selector terminal of said selector to an output terminal thereof and delay time by which said signal propagates from a toggle terminal of said toggle flip flop to an output terminal thereof.

7. The clock supply circuit according to claim 1, wherein said clock gate circuit comprises:
    a latch circuit which, when said clock signal applied to an enabling terminal is in a first logic state, outputs said control signal to be applied to a data input terminal and, when said clock signal applied to said enabling terminal is in a second logic state, keeps and outputs said control signal that is applied to said data input terminal right before said first logic state changes to said second logic state;
    a toggle flip flop that inverts output every time an output signal logic of said latch circuit is either rising or falling; and
    a selector for selectively outputting either said clock signal or output of said toggle flip flop in accordance with said output signal logic of said latch circuit.

8. The clock supply circuit according to claim 7, wherein:
    said latch circuit, when said clock signal applied to said enabling terminal is low level, outputs said control signal to be applied to said data input terminal and, when said clock signal is high level, keeps and outputs said control signal that is applied to said data input terminal right before said first logic state changes to said second logic state;

said selector selectively outputs said clock signal when said output signal of said latch circuit is high level, and selectively outputs said output of said toggle flip flop when said output signal is low level; and said toggle flip flop inversely outputs a stored signal of said toggle flip flop when said output signal of said latch circuit rises.

9. The clock supply circuit according to claim 7, further comprising a delay element for delaying to output a signal, which is inserted between an output terminal of said toggle flip flop and a data input terminal of said selector.

10. The clock supply circuit according to claim 9, wherein delay time of said delay element is set longer than a difference between delay time by which said signal propagates from a selector terminal of said selector to an output terminal thereof and delay time by which said signal propagates from a toggle terminal of said toggle flip flop to an output terminal thereof.

* * * * *